United States Patent
Cheng et al.

(10) Patent No.: US 10,407,174 B2
(45) Date of Patent: Sep. 10, 2019

(54) SEAT SUSPENSION INSTALLATION METHOD AND PASSENGER SEAT

(71) Applicant: SINGAPORE TECHNOLOGIES AEROSPACE LTD, Paya Lebar, Singapore (SG)

(72) Inventors: Siang Ann Cheng, Paya Lebar (SG); Guo Ying Zheng, Paya Lebar (SG)

(73) Assignee: ST ENGINEERING AEROSPACE LTD., Paya Lebar (SG)

( * ) Notice: Subject to any disclaimer, the term of this patent is extended or adjusted under 35 U.S.C. 154(b) by 72 days.

(21) Appl. No.: 15/540,548

(22) PCT Filed: Dec. 31, 2014

(86) PCT No.: PCT/SG2014/000630
§ 371 (c)(1),
(2) Date: Jun. 28, 2017

(87) PCT Pub. No.: WO2016/108752
PCT Pub. Date: Jul. 7, 2016

(65) Prior Publication Data
US 2018/0002022 A1   Jan. 4, 2018

(51) Int. Cl.
*B64D 11/06* (2006.01)

(52) U.S. Cl.
CPC .......... *B64D 11/0647* (2014.12); *B64D 11/06* (2013.01); *Y02T 50/46* (2013.01)

(58) Field of Classification Search
CPC ...... B64D 11/0647; B64D 11/06; Y02T 50/46
(Continued)

(56) References Cited

U.S. PATENT DOCUMENTS 4,790,496 A   12/1988   Marrujo
4,842,257 A   6/1989   Abu-Isa et al.
(Continued)

FOREIGN PATENT DOCUMENTS

CA   2540908 A1   12/2006
EP   0738490 A1   10/1996
(Continued)

OTHER PUBLICATIONS

Chinese Office Action dated Dec. 26, 2018 regarding Chinese Patent Application No. 201480084418.3 corresponding to U.S. Appl. No. 15/540,548 (6 pages).

*Primary Examiner* — Mark R Wendell
(74) *Attorney, Agent, or Firm* — Lewis Roca Rothgerber Christie LLP

(57) ABSTRACT

Various embodiments provide a method for installing a seat suspension on a seat frame having a first side frame member and a second side frame member opposed to and spaced apart from each other. The method may include moving a retainer on a first side of the seat suspension in a direction substantially perpendicular to a plane defined by the first and second side frame members for fastening onto a support member on the first side frame member; and moving a retainer on a second side of the seat suspension in the direction substantially perpendicular to the plane defined by the first and second side frame members for fastening onto a support member on the second side frame member. The second side of the seat suspension is opposed to and spaced apart from the first side of the seat suspension.

20 Claims, 7 Drawing Sheets

(58) Field of Classification Search
USPC .................................................. 297/452.18
See application file for complete search history.

(56) References Cited

U.S. PATENT DOCUMENTS

| | | |
|---|---|---|
| 4,869,554 A | 9/1989 | Abu-Isa et al. |
| 5,013,089 A | 5/1991 | Abu-Isa et al. |
| 5,088,747 A | 2/1992 | Morrison et al. |
| 5,092,654 A | 3/1992 | Inaba et al. |
| 5,328,248 A | 7/1994 | Nishiyama |
| 5,439,271 A | 8/1995 | Ryan |
| 5,441,331 A | 8/1995 | Vento |
| 5,560,683 A | 10/1996 | Penley et al. |
| 5,676,336 A | 10/1997 | Nefy et al. |
| 5,716,096 A | 2/1998 | Pryde et al. |
| 5,787,562 A | 8/1998 | Penley |
| 6,231,125 B1 | 5/2001 | Maeda et al. |
| 6,722,742 B2 | 4/2004 | Potes et al. |
| 6,802,568 B1 | 10/2004 | Johnson |
| 6,983,997 B2 | 1/2006 | Wilkerson et al. |
| 7,156,457 B2 | 1/2007 | Fujita et al. |
| 7,837,273 B1 | 11/2010 | Ratza et al. |
| 2006/0290180 A1 | 12/2006 | Belair et al. |
| 2017/0283071 A1* | 10/2017 | Velasco .............. B64D 11/0649 |

FOREIGN PATENT DOCUMENTS

| | | |
|---|---|---|
| EP | 1000856 | 5/2000 |
| EP | 2293980 | 3/2011 |
| FR | 2828455 A1 | 2/2003 |
| WO | WO 2010/069411 A1 | 6/2010 |

\* cited by examiner

SEAT SUSPENSION INSTALLATION METHOD AND PASSENGER SEAT

CROSS-REFERENCE TO RELATED APPLICATION(S)

This application is a National Phase Patent Application and claims priority to and the benefit of International Application Number PCT/SG2014/000630, filed on Dec. 31, 2014, the entire contents of which are incorporated herein by reference.

TECHNICAL FIELD

The present invention relates generally to a seat suspension installation method and to a passenger seat.

BACKGROUND

Backrest support of aviation seating system is traditionally made from rigid diaphragm, the design consideration of which has been primarily due to efforts in meeting flammability and load bearing compliance to aircraft interiors' cabin safety regulations.

However, the rigid diaphragm construction increases the weight to the entire seating system, and therefore increases the associated operational costs from heavier payload. Moreover, the stiff nature of this form of solution may cause passenger discomfort, which is highly undesirable especially for long flight. The compensation usually comes in the form of thicker backrest cushion. This in turn adds on cushion weight and is poorer aesthetically as well.

As an alternative to the rigid diaphragm, suspension fabric material has been introduced to backrest supports. Such integration reduces overall seating system weight by reducing the amount of foams in the backrest cushion.

Compared to rigid diaphragm, the stretchable suspension fabric may be poorer in maintaining its elasticity in fatigue aspect, and this requires replacement as part of maintenance effort. Furthermore, the fabric is unable to hold required contour due to its inherent properties, unlike sheet metal solutions. The existing installation methods include a "wrapped-around" method. FIG. 1 illustrates the wrapped-around installation 100, wherein the suspension fabric 102 is wrapped around a seatback frame 104. Using the wrapped-around method, it may be difficult to install or remove the suspension fabric assemblies, and their installation/removal processes may induce high stress on the seatback frame.

The wrapped-around method using a suspension fabric provided with zippers thereon may make it easier to install or remove the suspension fabric than the wrapped-around method of FIG. 1 using a suspension fabric without zippers, but the reliability of the system is subject to zipper's performances. In addition, such installation may not optimize the space utilization between the seatback frame.

SUMMARY

Various embodiments provide a method for installing a seat suspension on a seat frame having a first side frame member and a second side frame member opposed to and spaced apart from each other. The method may include moving a retainer on a first side of the seat suspension in a direction substantially perpendicular to a plane defined by the first and second side frame members for fastening onto a support member on the first side frame member; and moving a retainer on a second side of the seat suspension in the direction substantially perpendicular to the plane defined by the first and second side frame members for fastening onto a support member on the second side frame member. The second side of the seat suspension is opposed to and spaced apart from the first side of the seat suspension.

Various embodiments provide a passenger seat. The passenger seat may include a seat frame having a first side frame member and a second side frame member opposed to and spaced apart from each other; and a seat suspension installed on the seat frame. A retainer on a first side of the seat suspension is fastened onto a support member on the first side frame member in a direction substantially perpendicular to a plane defined by the first and second side frame members, and a retainer on a second side of the seat suspension is fastened onto a support member on the second side frame member in the direction substantially perpendicular to the plane defined by the first and second side frame members. The second side of the seat suspension is opposed to and spaced apart from the first side of the seat suspension.

BRIEF DESCRIPTION OF THE DRAWINGS

In the drawings, like reference characters generally refer to the same parts throughout the different views. The drawings are not necessarily to scale, emphasis instead generally being placed upon illustrating the principles of the invention. In the following description, various embodiments are described with reference to the following drawings, in which.

DESCRIPTION

Various embodiments provide a method for installing a seat suspension onto a seat frame in an easier and space-saving manner. The method of various embodiments not only can be used during manufacturing, but also can be used during maintenance.

In this context, the word "exemplary" is used herein to mean "serving as an example, instance, or illustration". Any embodiment or design described herein as "exemplary" is not necessarily to be construed as preferred or advantageous over other embodiments or designs.

In this context, the seat suspension installation method can be performed in various orientations, and thus it should be understood that the terms "side", "top", "bottom", "left", "right", "front", "back", "forward", "rear" etc., when used in the following description are used for convenience and to aid understanding of relative positions or directions, and not intended to limit the seat suspension installation method.

Figure 1:
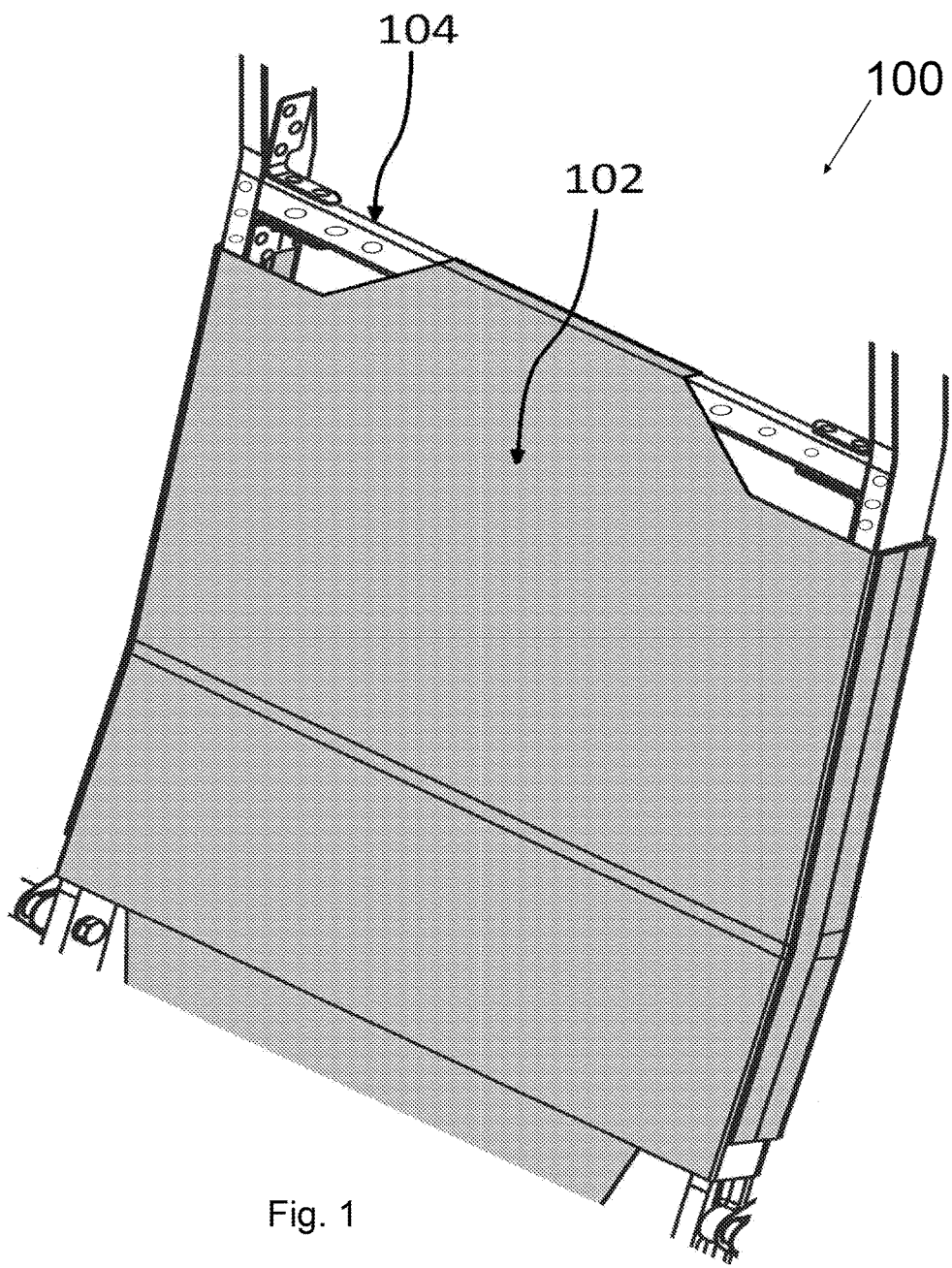
FIG. 1 shows a suspension fabric installed using a wrapped-around method.
Figure 2:
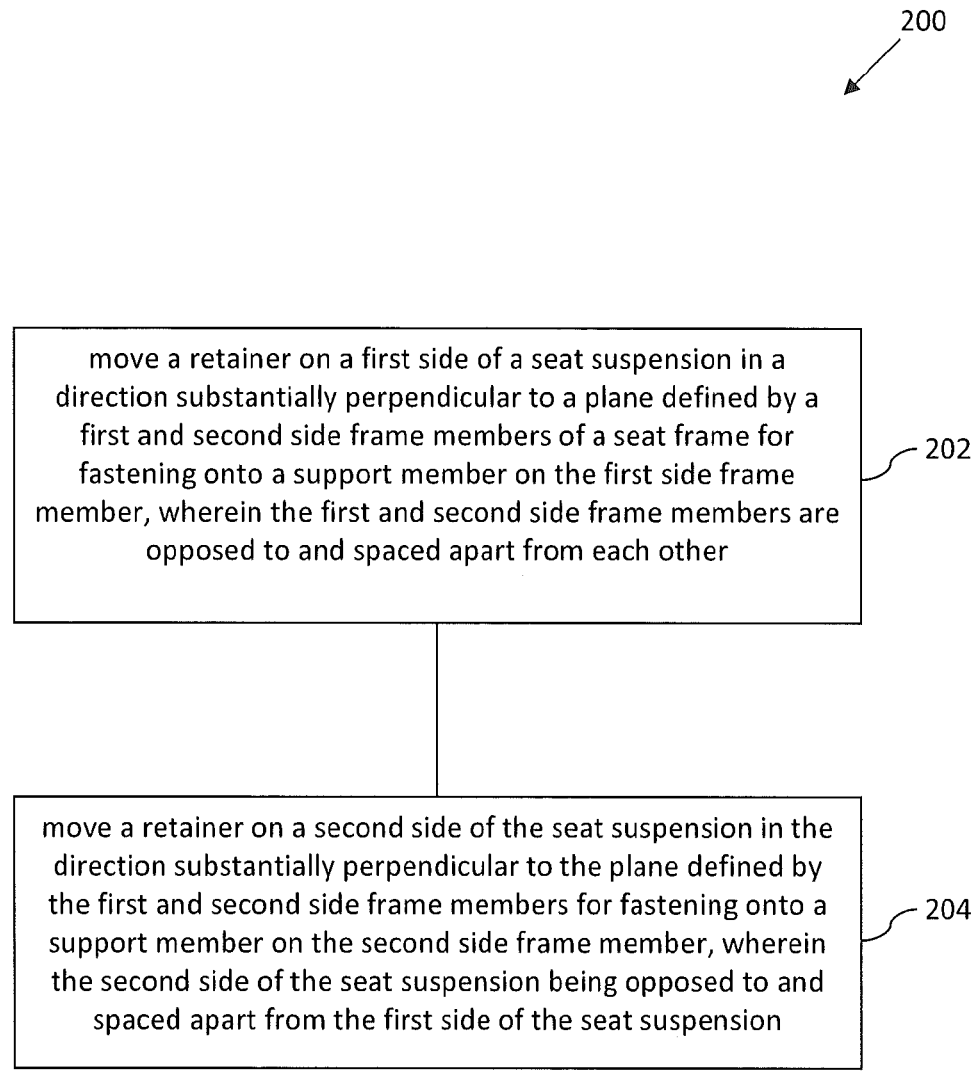
FIG. 2 shows a flowchart illustrating a method for installing a seat suspension according to various embodiments.

FIG. 2 shows a flowchart 200 illustrating a method for installing a seat suspension according to various embodiments. The seat frame may include a first side frame member and a second side frame member opposed to and spaced apart from each other.

At 202, a retainer on a first side of the seat suspension is moved in a direction substantially perpendicular to a plane defined by the first and second side frame members for fastening onto a support member on the first side frame member.

At 204, a retainer on the second side of the seat suspension is moved in the direction substantially perpendicular to the plane defined by the first and second side frame members for fastening onto a support member on the second side frame member. The second side of the seat suspension is opposed to and spaced apart from the first side of the seat suspension.

In various embodiments, the movement of the retainer on the first side of the seat suspension may include moving a plurality of retainers on the first side of the seat suspension in the direction substantially perpendicular to the plane defined by the first and second side frame members for fastening onto a plurality of support members on the first side frame member. The first side frame member may include a plurality of portions at an angle with each other, and the plurality of support members are respectively located on the plurality of portions of the first side frame member. In various embodiments, the first side frame member may include a plurality of straight portions at an angle with each other, and the plurality of support members are respectively located on the plurality of portions of the first side frame member. In various embodiments, the first side frame member may be of a curved shape, and the plurality of support members may be located corresponding to the curved shape of the first side frame member.

In various embodiments, the movement of the retainer on the second side of the seat suspension may include moving a plurality of retainers on the second side of the seat suspension in the direction substantially perpendicular to the plane defined by the first and second side frame members for fastening onto a plurality of support members on the second side frame member. The second side frame member may include a plurality of portions at an angle with each other, and the plurality of support members are respectively located on the plurality of portions of the second side frame member. In various embodiments, the second side frame member may include a plurality of straight portions at an angle with each other, and the plurality of support members are respectively located on the plurality of portions of the second side frame member. In various embodiments, the second side frame member may be of a curved shape, and the plurality of support members may be located corresponding to the curved shape of the second side frame member.

According to various embodiments, the installation method may include stretching the seat suspension from the first side frame member towards the second side frame member. The seat suspension may be stretched towards the second side frame member after the first side of the seat suspension is installed on the first side frame member, so as to install the second side of the seat suspension onto the second side frame member.

In various embodiments, after the retainer on the first side of the seat suspension is fastened onto the support member on the first side frame member, a rod may be inserted into a loop member provided along the second side of the seat suspension, and the seat suspension may be stretched from the first side frame member towards the second side frame member by means of the rod. In various embodiments, the retainer on the second side of the seat suspension may be fastened onto the support member on the second side frame member, and the rod is removed from the loop member.

In various embodiments, the loop member may include or may be split into a plurality of loop portions. The loop member may be split into the plurality of loop portions by forming a cut between adjacent loop portions.

In various embodiments wherein the plurality of loop portions are included in the loop member, the rod may be inserted into the plurality of loop portions concurrently and the seat suspension is stretched from the first side frame member towards the second side frame member by means of the rod. By stretching the seat suspension towards the second side frame member, the retainer or the plurality of retainers on the second side of the seat suspension may be moved in the direction substantially perpendicular to the plane defined by the first and second side frame members, and may be fastened onto the support member or the plurality of support members on the second side frame member.

In various embodiments wherein the plurality of loop portions are included in the loop member, the rod may be inserted into one of the plurality of loop portions and the seat suspension is stretched from the first side frame member towards the second side frame member by means of the rod. One of a plurality of retainers on the second side of the seat suspension, e.g. the retainer located corresponding to the loop portion with the rod inserted therein, is fastened onto one of a plurality of support members on the second side frame member, e.g. the support member located corresponding to the retainer which is moved. The rod may be removed and inserted into a subsequent loop portion of the plurality of loop portions for stretching the seat suspension, and a subsequent retainer of the plurality of retainers on the second side of the seat suspension may be fastened onto a subsequent support member of the plurality of support members on the second side frame member. The above process may be repeated for all loop portions until all of the plurality of retainers on the second side of the seat suspension have been fastened onto the corresponding support members on the second side frame member.

In various embodiments, the loop member may be sewn or attached along the second side of the seat suspension. The loop member may be made using the same material as the seat suspension, and may be formed as an integral part of the seat suspension. The loop member may also be made using different material from the seat suspension.

According to various embodiments, each of the retainers may include an elongated body extending along the first side or the second side of the seat suspension.

In various embodiments, the retainers may include J-shaped or C-shaped retainers, or may be of any suitable shape or form which is able to be fastened onto the seat frame, and may be of any suitable geometric sizing to allow continuous latching and quick installation onto the seat frame. The retainers may have an elongated body with a J-shaped or C-shaped cross-section, or a cross-section of any suitable shape corresponding to the support member. In various embodiments, the retainer may include a pair of apposing edges connected by a connecting edge, wherein the retainer is fastened to the support member such that the pair of apposing edges extends in the direction substantially perpendicular to the plane defined by the first and second side frame members. The support member may be received in between the pair of apposing edges of the retainer such that the retainer and the support member are fastened together.

In various embodiments, the retainers may be made of plastic, metal or composite. The retainers may be made of any other material having sufficient strength for the retainers to hold the seat suspension, when the seat suspension is loaded with or without passenger load. The retainers may be sewn or attached along the first side or the second side of the seat suspension.

In various embodiments, the support member may be arranged to protrude substantially perpendicularly from the plane defined by the first and second side frame members. In various embodiments, the support member may be of any shape that fits the shape of the retainers for the retainers to be fastened or clipped on the support member. In various embodiments, the support member may be made of plastic, metal, composite, or any suitable material that is sufficiently strong to hold the load received by the seat suspension, with or without passenger load.

In various embodiments, the seat frame may be a seat back frame. In various embodiments, the seat frame may also be a seat pan frame.

In various embodiments, the seat suspension may be or may include a seat suspension fabric, or a seat suspension membrane or sheet made of any suitable material.

Various embodiments further provide a passenger seat. The passenger seat may include a seat frame having a first side frame member and a second side frame member opposed to and spaced apart from each other, and a seat suspension installed on the seat frame. A retainer on a first side of the seat suspension may be fastened onto a support member on the first side frame member in a direction substantially perpendicular to a plane defined by the first and second side frame members, and a retainer on a second side of the seat suspension may be fastened onto a support member on the second side frame member in the direction substantially perpendicular to the plane defined by the first and second side frame members. The second side of the seat suspension is opposed to and spaced apart from the first side of the seat suspension.

According to various embodiments, the passenger seat may include a plurality of retainers on the first side of the seat suspension fastened onto a plurality of support members on the first side frame member in the direction substantially perpendicular to the plane defined by the first and second side frame members. The first side frame member may include a plurality of portions at an angle with each other, and the plurality of support members are respectively located on the plurality of portions of the first side frame member.

According to various embodiments, the passenger seat may include a plurality of retainers on the second side of the seat suspension fastened onto a plurality of support members on the second side frame member in the direction substantially perpendicular to the plane defined by the first and second side frame members. In various embodiments, the second side frame member may include a plurality of portions at an angle with each other, and the plurality of support members are respectively located on the plurality of portions of the second side frame member.

In various embodiments, the seat suspension may include a loop member along the second side of the seat suspension, wherein the loop member is configured to receive a rod therein during installation of the seat suspension onto the seat frame.

In various embodiments, the loop member may include or may be split into a plurality of loop portions. In various embodiments, the loop member may be split into the plurality of loop portions by forming a cut between adjacent loop portions.

In various embodiments, the loop member is sewn or attached along the second side of the seat suspension. The loop member may be made using the same material as the seat suspension, and may be formed as an integral part of the seat suspension. The loop member may also be made using different material from the seat suspension.

According to various embodiments, each of the retainers may include an elongated body extending along the first side or the second side of the seat suspension.

In various embodiments, the retainers may include J-shaped or C-shaped retainers, or may be of any suitable shape or form which is able to be fastened onto the seat frame, and may be of any suitable geometric sizing to allow continuous latching and quick installation onto the seat frame. The retainers may have an elongated body with a J-shaped or C-shaped cross-section, or with a cross-section of any suitable shape corresponding to the support member. In various embodiments, the retainer may include a pair of apposing edges connected by a connecting edge, wherein the retainer is fastened to the support member such that the pair of apposing edges extends in the direction substantially perpendicular to the plane defined by the first and second side frame members. The support member may be received inbetween the pair of apposing edges of the retainer such that the retainer and the support member are fastened together.

In various embodiments, the retainers may be made of plastic, metal or composite. The retainers may be made of any other material having sufficient strength for the retainers to hold the seat suspension, when the seat suspension is loaded with or without passenger load. The retainers may be sewn or attached along the first side or the second side of the seat suspension.

In various embodiments, the support member may be arranged to protrude substantially perpendicularly from the plane defined by the first and second side frame members. In various embodiments, the support member may be of any shape that fits the shape of the retainers for the retainers to be fastened or clipped on the support member. In various embodiments, the support member may be made of plastic, metal, composite, or any suitable material that is sufficiently strong to hold the load received by the seat suspension, with or without passenger load.

In various embodiments, the seat frame may be a seat back frame. In various embodiments, the seat frame may also be a seat pan frame.

In various embodiments, the seat suspension may be or may include a seat suspension fabric, or a seat suspension membrane or sheet made of any suitable material.

Various embodiments of the seat suspension installation method described in this description are analogously valid for the passenger seat, and vice versa.

Various embodiments of the seat suspension installation method and the passenger seat will be described with reference to the figures in more detail below.

Figure 3:
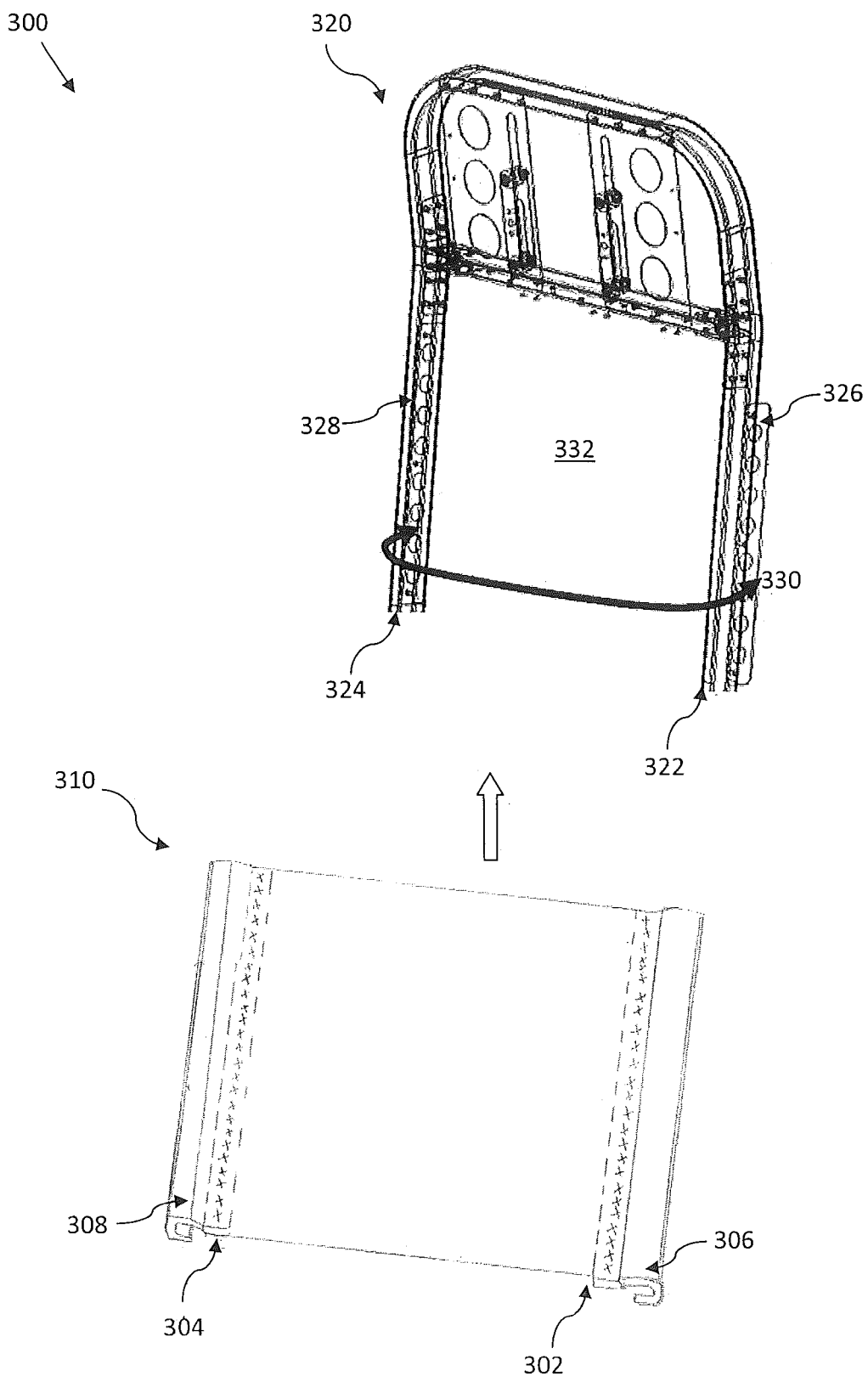
FIG. 3 shows a schematic drawing illustrating a seat frame and a seat suspension to be installed onto the seat frame according to various embodiments.

FIG. 3 shows a schematic drawing 300 illustrating a seat frame and a seat suspension to be installed onto the seat frame according to various embodiments.

FIG. 3 shows a seat suspension 310 and a seat frame 320. The seat suspension 310 may be a suspension fabric which is tailored to match seat back geometry and contour. The seat suspension 310 may also be a seat suspension membrane or sheet made of any suitable material.

A first side 302 and a second side 304 of the seat suspension 310 are opposed to and spaced apart from each other. In this exemplary embodiment, the first side 302 and the second side 304 are illustrated as the right side and the left side of the seat suspension, when the seat suspension is oriented upright in its installed state. It is understood that the first side 302 and the second side 304 may also be the top side and the bottom side of the seat suspension in its upright orientation.

A retainer 306 may be provided on the first side 302, and a retainer 308 may be provided on the second side 304. In an embodiment, the retainers 306, 308 may be sewn along the first side 302 and the second side 304, e.g. using the sewn threads as illustrated in FIG. 3.

In various embodiments, each of the retainers 306, 308 may include an elongated body extending along the first side 302 or the second side 304 of the seat suspension 310.

The retainers 306, 308 may include J-shaped or C-shaped retainers. In an exemplary embodiment, the J-shaped retainers 306, 308 are shown in FIG. 3 having an elongated body with a J-shaped cross-section.

The retainers 306, 308 may be made of plastic, metal or composite. The retainers may be made of any other material having sufficient strength for the retainers to hold the seat suspension, when the seat suspension is loaded with or without passenger load. In exemplary embodiments, the retainers 306, 308 are sewn along the first side 302 and the second side 304 of the seat suspension 310, respectively. In other embodiments, the retainers 306, 308 may be attached or fixed to the first side 302 and the second side 304 using other suitable means, such as heat staking or integrally forming or molding the retainers 306, 308 to the seat suspension 310.

In the exemplary embodiments shown in FIG. 3, the seat frame 320 is a seat back frame. It is understood that the seat frame 320 may also be a seat pan frame and the seat suspension installation method of various embodiments may be applied in a similar manner.

The seat frame 320 includes a first side frame member 322 and a second side frame member 324 opposed to and spaced apart from each other. In this exemplary embodiment, the first side frame member 322 and the second side frame member 324 are illustrated as the right side frame member and the left side frame member of the seat frame 320 in its upright orientation. It is understood that the first side frame member 322 and the second side frame member 324 may also be the top side frame member and the bottom side frame member of the seat frame for the seat suspension 310 to be installed in such a manner.

A support member 326 may be located on the first side frame member 322, and a support member 328 may be located on the second side frame member 324. The support members 326, 328 may be brackets or strips mounted on or attached to the first and second side frame members 322, 324, respectively. The support members 326, 328 may be of any shape that fits the shape of the female portion of the retainers 306, 308. The support members 326, 328 may be arranged to protrude substantially perpendicularly from the plane 332 defined by the first and second side frame members 322, 324. For example, the support members 326, 328 are shown to protrude outward from the plane 332 of the seat frame 320 and extend backwardly. In various embodiments, the support members 326, 328 may be made of plastic, metal, composite, or any suitable material that is strong enough to hold the load received by the seat suspension 310, with or without passenger load.

In exemplary embodiments shown in FIG. 3, the seat suspension 310 is installed onto the front side of the seat frame 320 in a rear-facing direction. It is understood that the seat suspension 310 may also be installed onto the back side of the seat frame in a forward-facing direction in other embodiments.

According to be installation method of various embodiments, the retainer 306 on the first side 302 of the seat suspension 310 is moved in the direction 330 substantially perpendicular to the plane 332 defined by the first and second side frame members 322, 324, for fastening onto the support member 326 on the first side frame member 322.

After the retainer 306 on the first side 302 of the seat suspension 310 is fastened onto the support member 326, the seat suspension 310 may be stretched towards the second side frame member 324 so that the retainer 308 on the second side 304 of the seat suspension 310 is sufficiently close to the support member 328 on the second side frame member 324. The seat suspension 310 may be stretched using a loop design and a rod, as will be described in more detail below.

The retainer 308 on the second side 304 of the seat suspension 310 is moved in the direction 330 substantially perpendicular to the plane 332 so as to be fastened onto the support member 328 on the second side frame member 324. In this manner, the seat suspension 310 is installed onto the seat frame 320.

Figure 4:
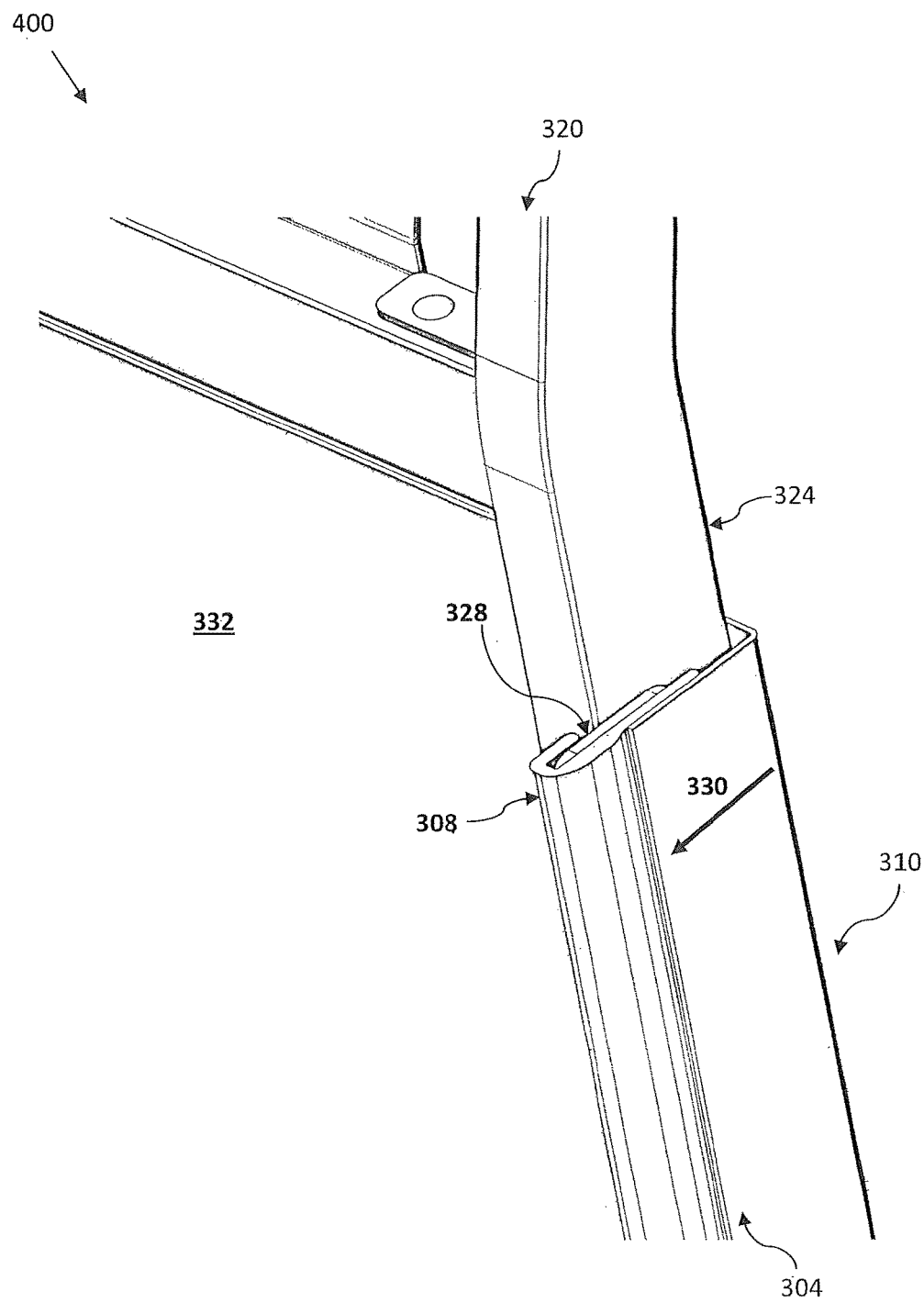
FIG. 4 shows a schematic drawing illustrating a passenger seat having a seat suspension installed onto a seat frame according to various embodiments.

FIG. 4 shows a schematic drawing illustrating a passenger seat 400 having a seat suspension installed onto a seat frame according to various embodiments.

The passenger seat 400 may include the seat suspension 310 and the seat frame 320 illustrated in FIG. 3 in an installed state, wherein the second side 304 of the seat suspension 310 installed onto the second side frame member 324 are shown.

As shown in FIG. 4, the support member 328 may protrude substantially perpendicularly from the plane 332 defined by the first and second side frame members of the seat frame 320. For example, the support member 328 is shown to protrude outward and backward from the second seat frame member 324.

The retainer 308 is fastened or latched onto the support member 328 on the second side frame member 324 in the direction 330 substantially perpendicular to the plane 332 defined by the first and second side frames of the seat frame 320. The retainer 308 installed in such a manner may be received on the mounting provision on the seat frame, e.g. on the support member 328 protruding substantially perpendicularly from the plane 332 as shown in FIG. 4.

In exemplary embodiments shown in FIG. 4, the retainer 308 may include a pair of apposing edges connected by a connecting edge, wherein the retainer 308 is fastened to the support member 328 such that the pair of apposing edges extends in the direction 330 substantially perpendicular to the plane 332 defined by the first and second side frame members.

Although the retainers 306, 308 are J-shaped retainers as illustrated in the exemplary embodiments above, it is understood that the retainers may be of any suitable shape or form which is able to be fastened onto the seat frame, and may be of any suitable geometric sizing to allow continuous latching and quick installation onto the seat frame.

According to various embodiments, the integration of the seat suspension and the seat frame is realized using retainers and support members with rear-facing engagement. This may ensure that the seat suspension conforms to the shape and contour of the seat back frame, and therefore the intent of creating comfortable sitting position at the interface to passenger is retained throughout the servicing operation after the seats are installed in aircraft. By moving the retainers in the direction substantially perpendicular to the plane defined by the side frame members and fastening the retainers thereby, seat suspension may be easier to be installed during maintenance, in which situation there may be limited space at the side of an aircraft seat, e.g. for an aircraft seat next to the window. Compared to clip-on designs in which the clips/retainers move sideways, the perpendicular movement of the retainers in the embodiments is advantageous in that less space is needed on the sides of the seat frame. The retainers can be flat with a small thickness and yet have a good strength (e.g., in J shape). Whereas for clip-on designs in which clips/retainers move in from the side of the seat frame, the clips/retainers have to protrude the side before clip-on, requiring more space on the sides of the seat frame and requiring thick clips/retainers to clip onto the side of the seat frame. Further, compared to the clip-on designs in which clips/retainers move in from the side of the seat frame, the installation method of various embodiments is advantageous in that fastening of retainers may be more secure, since the retainers fastened in the manner according to various embodiments are less likely to dislodge during use.

Compared to the wrapped-around installation, various embodiments of the method install the seat suspension on either the front side or the back side of the seat frame and also provide additional usable space between the seat frame that may be used for seatback amenity or stowage. In various embodiments wherein the seat suspension is installed from the front side of the seat frame, additional space at the backside of the seat frame is available and may be used for seatback amenity or stowage.

According to various embodiments, the use of retainers may ensure that the stretch load is evenly distributed along the two longitudinal sides of the seat back frame. This eliminates the existing requirement of locally reinforcing the seat back frame where the suspension fabric is connected. The thread sew lines, connecting the seat suspension and retainers, are designed for similar consideration. According to various embodiments of the seat suspension installation method and the passenger seat, an even distribution of stretch load onto the retainers may be achieved. This helps to increase the fatigue life of the seat back assembly which is constantly subjected to human seating loads and aircraft vibrations.

Depending on the design and contour of the seat frame, the seat suspension may be adapted accordingly as described in more detail below.

FIGS. 5(a) and 5(b) respectively show an isometric view and a side view of a seat frame 500 according to various embodiments.

Similar to the seat frame 320 of FIG. 3, the seat frame 500 includes a first side frame member and a second side frame member opposed to and spaced apart from the first side frame member.

The first side frame member of the seat frame 500 may include a plurality of portions at an angle with each other. In the exemplary embodiments shown in FIG. 5, the first side frame member includes an upper portion 502 and a lower portion 504 at an angle with the upper portion 502. The second side frame member may include an upper portion 506 and a lower portion 508 at an angle with the upper portion 506. The upper portions 502, 506 of the first and second side frame members define an upper plane 532. The lower portions 504, 508 of the first and second side frame members define a lower plane 534. The lower plane 534 is inclined forward with respect to the upper plane 532 in an exemplary embodiment.

According to the above exemplary embodiments, the seat frame 500 may be a two-planed seat frame. The upper plane 532 runs vertically, e.g., to support human spinal in an upright position. The lower plane 534 is inclined forward, e.g., to seamlessly integrate with the lumbar support. The change of angle from the lower plane 534 to the upper plane 532 may be designed or configured based on the anthropometry data to achieve comfortable sitting position for passengers. The conformity may reduce uneven pressure distribution on the erector spinal and oblique muscles seen in the single plane seat frame design.

Corresponding to the first and second side frame members, an upper support member 512 and a lower support member 514 may be respectively located on the upper portion 502 and the lower portion 504 of the first side frame member, and an upper support member 516 and a lower support member 518 may be respectively located on the upper portion 506 and the lower portion 508 of the second side frame member.

In exemplary embodiments, the upper support members 512, 516 may be longer than the lower support members 514, 518. The upper support members 512, 516 and the lower support members 514, 518 may be arranged to be parallel to the contour of the seat frame 500.

Although the exemplary embodiments above describes a two-planed seat frame, it is understood that various embodiments may be applied to a multiple-planed seat frame wherein more than two portions may be included in each of the first and second side frame members, or may be applied to a curved seat frame wherein a plurality of curved portions may be included in each of the first and second side frame members. The number of support members and the curvature of the support members may be adapted according to the curvature of the side frame members.

Various embodiments of the seat frame and the support members described above with respect to FIGS. 2 to 4 are analogously valid for the seat frame 500, and vice versa.

Figure 6:
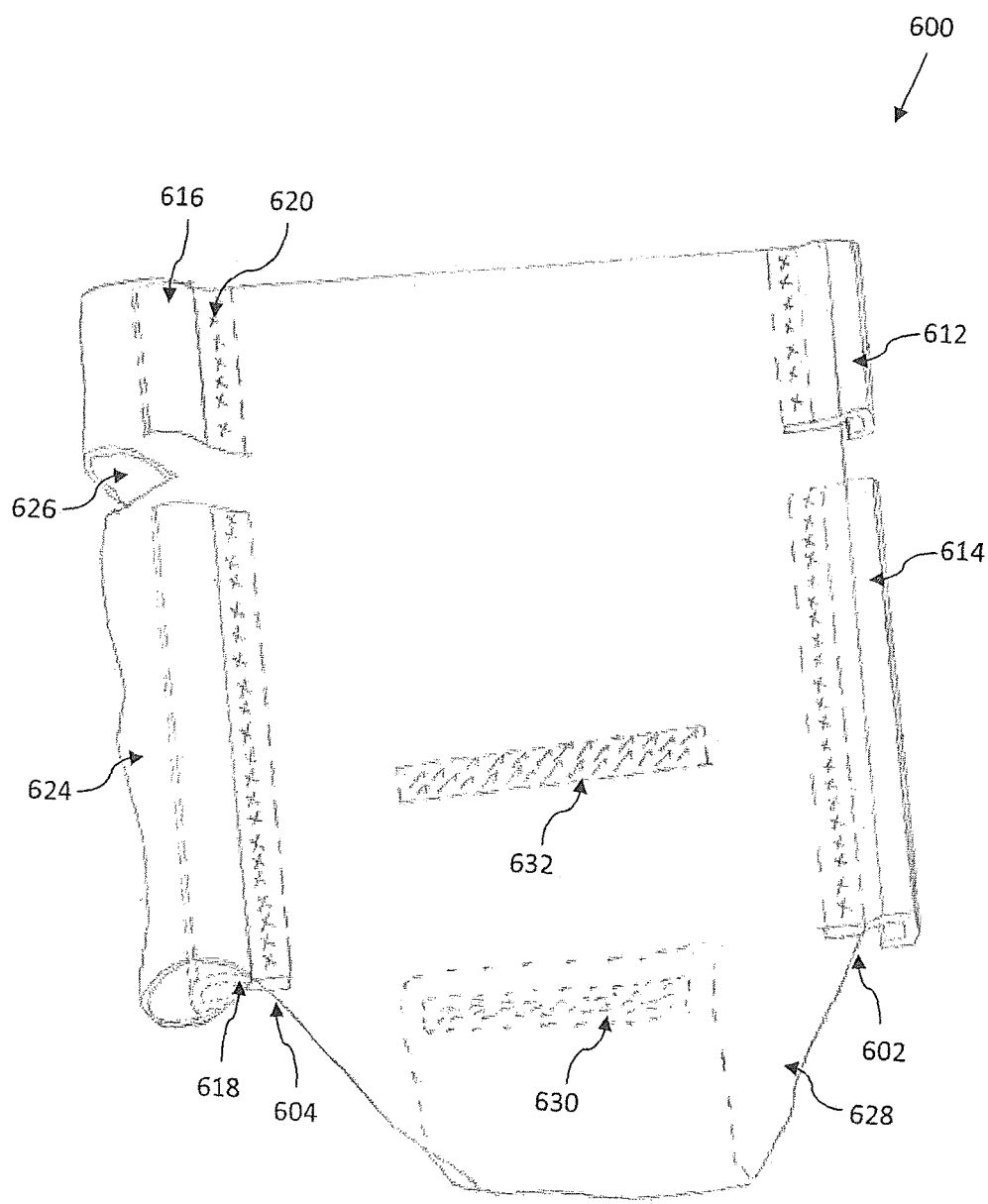
FIG. 6 shows a schematic drawing illustrating a seat suspension according to various embodiments.

FIG. 6 shows a schematic drawing illustrating a seat suspension 600 according to various embodiments.

Figure 5:
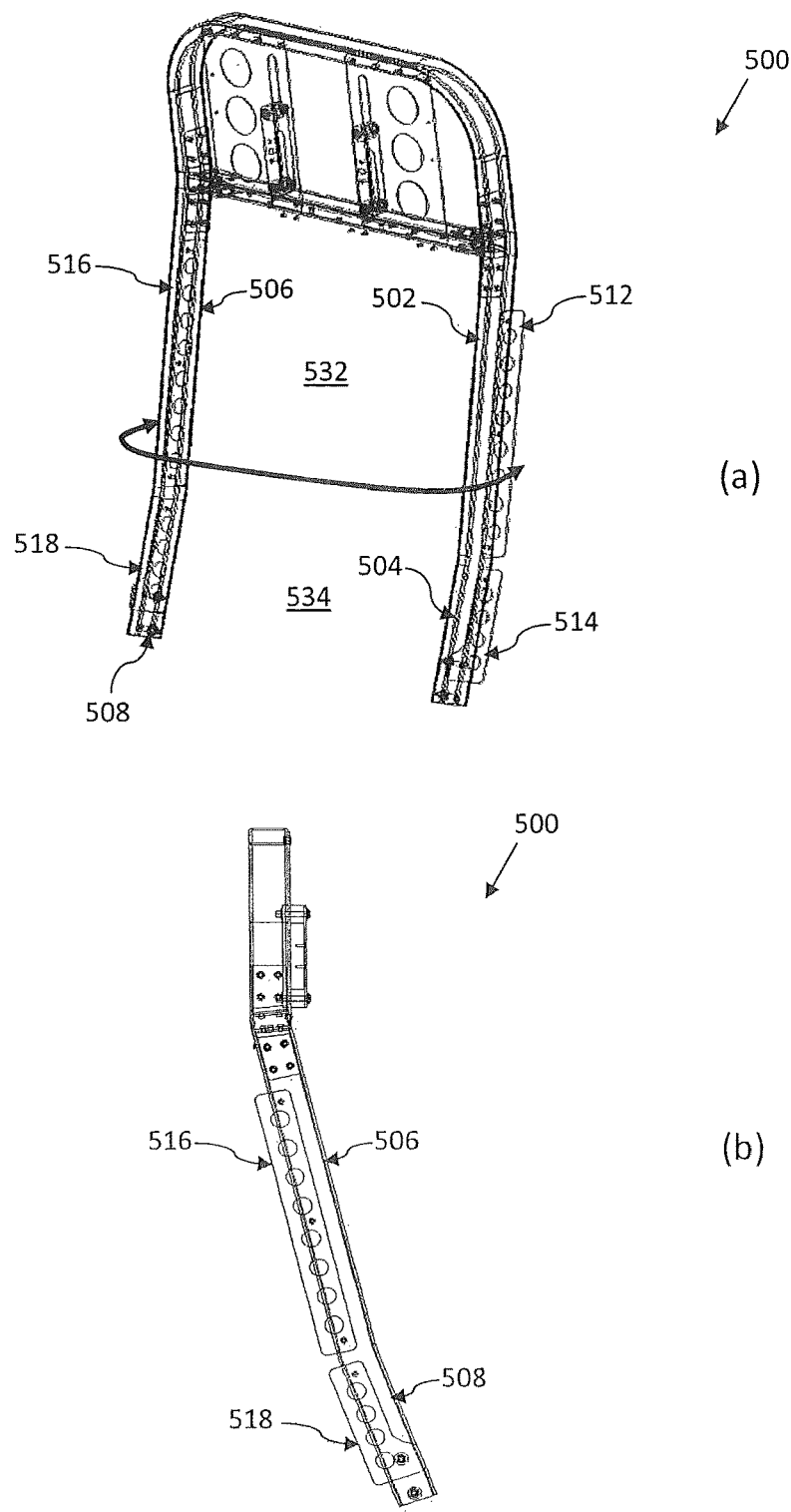
FIGS. 5(a) and 5(b) show an isometric view and a side view of a seat frame according to various embodiments.

The seat suspension 600 may be configured for installation onto the seat frame 500 of FIG. 5. In various embodiments, the seat frame 500 includes a first side 602 and a second side 604 opposed to and spaced apart from each other.

A plurality of retainers may be respectively provided on the first side 602 and the second side 604 of the seat suspension 600. In exemplary embodiments of FIG. 6, an upper retainer 612 and a lower retainer 614 are provided on the first side 602, and an upper retainer 616 and a lower retainer 618 are provided on the second side 604. The first side 602 and the second side 604 of the seat suspension 600 may be sewn with threads 620, e.g. nylon threads, to fix the retainers 612, 614, 616, 618 thereon. The location and geometric size of the upper retainers and the lower retainers may be configured in accordance with the location and geometric size of the support members 512, 514, 516, 518.

According to various embodiments, the use of plurality of retainers at each side of the seat suspension may ensure that the stretch load is evenly distributed along the two longitudinal sides of the seat back frame, for example, when the two longitudinal sides of the seat back frame is curved or inclined. According to various embodiments, an even distribution of stretch load onto the retainers may be achieved, thereby increasing the fatigue life of the seat suspension.

The tension induced in the seat suspension fabric may be varied by controlling the lateral dimensions of the suspension fabric sewn on the retainers. This may allow preference to be exercised on the stiffness of the diaphragm created for ergonomic purposes.

Various embodiments of the seat suspension and the retainers described above with reference to FIGS. 2 to 4 are analogously valid for the seat suspension 600 and the retainers, and vice versa.

In various embodiments, the seat suspension may further include a loop member 624 along the second side 604 of the seat suspension 600, wherein the loop member 624 is configured to receive a rod therein during installation of the seat suspension 600 onto the seat frame. The loop member 624 may be formed with excess fabric at the second side 604 of the seat suspension 600, and may be sewn with the threads 620 which are also used for holding the retainers. The loop member 624 may be formed as an integral part of the seat suspension 600, or as a separate part attached to the seat suspension 600.

In various embodiments, the loop member 624 may include or may be split into a plurality of loop portions. The loop member 624 may be split into the plurality of loop portions by forming a cut between adjacent loop portions. In exemplary embodiments of FIG. 6, a V-shaped cut 626 is formed on the loop member 624 to separate adjacent loop portions, which may allow the option of using a loading rod to grip either each of the loop portion or both loop portions concurrently.

In various embodiments, the seat suspension 600 may further include a flap 628 at the bottom for integration with a seat pan. The flap 628 may help to retain the surface tension in the vertical orientation and may create gradually transformation to the seat pan.

In various embodiments, a loop fastener 630 may be sewn onto the edge of the flap 628, and a mating hook fastener 632 may be sewn in the vicinity of the loop fastener 630. The loop and hook fastener, e.g. Velcro, includes the loop fastener 630 and the mating hook fastener 632 and is used to hold the flap 628 in place. The loop fastener 630 and the mating hook fastener 632 may be made of fabric, e.g. nylon, polyester, etc. In addition to hook and loop fastener, any other quick releasable fastener, such as buttons, may be included in the seat suspension.

During installation of the seat suspension 600 onto the seat frame 500, the upper retainer 612 and the lower retainer 614 may be respectively moved in the respective directions substantially perpendicular to the upper plane 532 and the lower plane 534 defined by the first and second side frame members, and respectively latched onto the protrusion of the upper support members 512 and the lower support members 514 on the first side of the seat frame 500.

A loading rod may be inserted or put through the loop member 624, and is used to stretch the seat suspension 600 across the forward surface of the seat frame 500 from the first side to the second side of the seat frame 500. The direction of the stretching, for example, from left to right or from right to left, depends on the location of the loop member 624. The stretching according to the embodiments may allow the suspension fabric to hug tightly to the side and forward faces of the seat frame 500.

In various embodiments, the rod may be inserted into the plurality of loop portions of the loop member 624 concurrently, and the seat suspension is stretched from the first side frame member towards the second side frame member by means of the rod. By stretching the seat suspension 600 towards the second side frame member, the retainers 616, 618 on the second side 604 of the seat suspension 600 may be respectively moved in the directions substantially perpendicular to the upper plane 532 and the lower plane 534 defined by the first and second side frame members.

Figure 7:
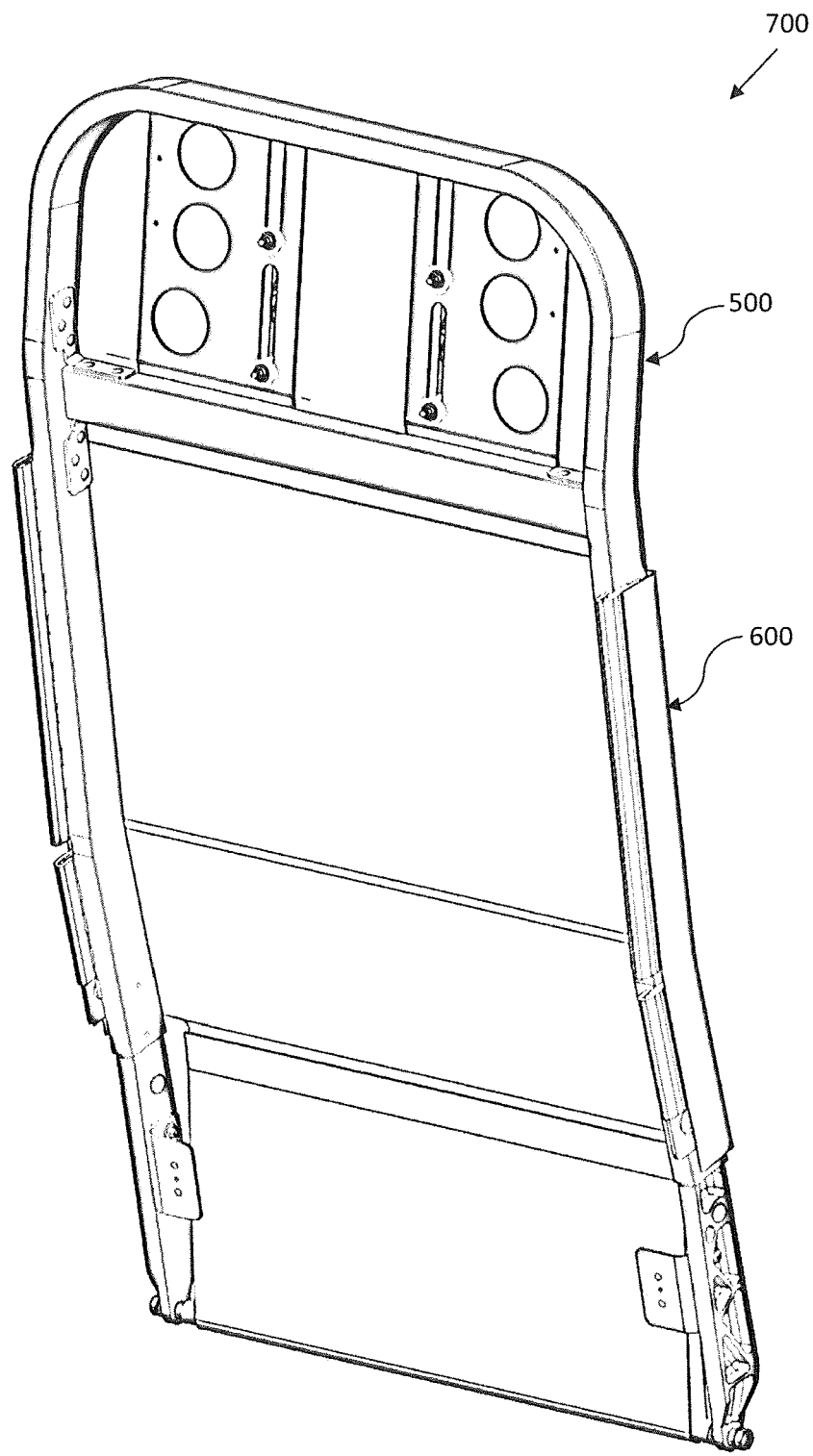
FIG. 7 shows a schematic drawing illustrating a passenger seat according to various embodiments.

When the retainers 616, 618 on the second side 604 of the seat suspension 600 are close enough to the upper support member 516 and the lower support member 518 of the second side frame member, the retainers 616, 618 are respectively latched onto the upper support member 516 and the lower support member 518, to form the passenger 700 as shown in FIG. 7.

In various embodiments, the rod may be inserted into one of the plurality of loop portions of the loop member 624, e.g. the upper loop portion, and the seat suspension 600 is stretched from the first side frame member towards the second side frame member by means of the rod. One of a plurality of retainers on the second side 604 of the seat suspension 600, e.g. the upper retainer 616 located corresponding to the upper loop portion with the rod inserted therein, is fastened onto one of a plurality of support members on the second side frame member, e.g. the upper support member 516 located corresponding to the upper retainer 616 which is moved. The rod may be removed and inserted into a subsequent loop portion of the plurality of loop portions, e.g. the lower loop portion, for stretching the seat suspension 600. A subsequent retainer of the plurality of retainers, e.g. the lower retainer 618, on the second side 604 of the seat suspension 600 may be fastened onto a subsequent support member of the plurality of support members on the second side frame member, e.g. the lower support member 518. In embodiments wherein more than two loop portions are included in the loop member 624, the above process may be repeated for all loop portions until all of the plurality of retainers on the second side of the seat suspension have been fastened onto the corresponding support members on the second side frame member.

FIG. 7 shows a schematic drawing illustrating a passenger seat 700 according to various embodiments, wherein the seat suspension 600 of FIG. 6 has been installed on the seat frame 500 of FIG. 5 according to the method of various embodiments above.

The installation method of various embodiments can be provided for aircraft seat production as well as for maintenance of seats already installed on aircrafts. For maintenance, the manual operation of using the loading loop member and the rod preferably allows the technician to ergonomically install the suspension fabric onto its receiving support members on the seat frame. The operation advantageously may only require a single technician to clutch onto both ends of the rod and pull inwards to install comfortably. The loading rod may be bent or contoured similarly to the seat frame for simultaneous gripping of two loading loops in a single motion. For production line runs, mechanized jigs can make use of the loading loop to mount the seat suspension onto the seat frame. Further, the method of various embodiments in which retainers are moved and fastened in a perpendicular direction at the sides of the seat frame allows minimum removal effort, as accessibility is only required at the sides of seat frame (e.g. the left side and the right side of the seat frame) at its installed position. Accordingly, the installation method of various embodiments allows the removal and maintenance of the seat suspension on aircraft without having to remove the seatback frame. For the wrapped-around seat design having a seat suspension without zipper, to service each seat in a 3-seat arrangement, all seatback frames have to be removed from the aircraft in order to access the seat suspension. Compared with the wrapped-around seat design, the installation method of various embodiments requiring accessibility at the side of the seat frame allows the removal of seat suspension while the seatback frame is still in its rigid position on aircraft. This installation method of various embodiments can be advantageously performed by any qualified technicians without additional training, thereby saving both time and cost.

While the various embodiments above have been described with regard to a seat back frame and the installation of the seat suspension at the front side of the seat back frame, it is understood that the method of various embodiments may also be applied in the installation of the seat suspension at the back side of the seat back frame and may also be applied to a seat pan.

While the invention has been particularly shown and described with reference to specific embodiments, it should be understood by those skilled in the art that various changes in form and detail may be made therein without departing from the spirit and scope of the invention as defined by the appended claims. The scope of the invention is thus indicated by the appended claims and all changes which come within the meaning and range of equivalency of the claims are therefore intended to be embraced.

What is claimed is:

1. A method for installing a seat suspension layer on a seat frame having a first side frame member and a second side frame member opposed to and spaced apart from each other, the method comprising:
moving a plurality of retainers on a first side of the seat suspension layer in respective directions substantially perpendicular to respective planes defined by the first and second side frame members for fastening onto a first plurality of support members respectively located on a plurality of portions of the first side frame member, wherein the respective planes defined by the first and second side frame members are inclined relative to each other; and
moving a plurality of retainers on a second side of the seat suspension layer in the respective directions substantially perpendicular to the respective planes defined by the first and second side frame members for fastening onto a second plurality of support members respectively located on a plurality of portions of the second side frame member, the second side of the seat suspension layer being opposed to and spaced apart from the first side of the seat suspension layer;
wherein the respective planes are defined by pairs of a respective portion of the plurality of portions of the first side frame member and a corresponding respective portion of the plurality of portions of the second side frame member;
wherein each retainer on the first side of the seat suspension layer comprises an elongated body extending along a respective one of the plurality of portions of the first side frame member and each retainer on the second side of the seat suspension layer comprises an elongated body extending along a respective one of the plurality of portions of the second side frame members.

2. The method according to claim 1, further comprising:
inserting a rod into a loop member provided along the second side of the seat suspension layer, after the retainers on the first side of the seat suspension layer are fastened onto the support members on the first side frame member; and
stretching the seat suspension layer from the first side frame member towards the second side frame member by means of the rod.

3. The method according to claim 2, further comprising:
fastening the retainers on the second side of the seat suspension layer onto the support members on the second side frame member; and
removing the rod from the loop member.

4. The method according to claim 2, wherein the loop member is split into a plurality of loop portions.

5. The method according to claim 4,
wherein the loop member is split into the plurality of loop portions by forming a cut between adjacent loop portions.

6. The method according to claim 4, further comprising:
inserting the rod into the plurality of loop portions concurrently; and
stretching the seat suspension layer from the first side frame member towards the second side frame member by means of the rod.

7. The method according to claim 4, further comprising:
inserting the rod into one of the plurality of loop portions;
stretching the seat suspension layer from the first side frame member towards the second side frame member by means of the rod;
fastening one of the plurality of retainers on the second side of the seat suspension layer onto one of the second plurality of support members on the second side frame member.

8. The method according to claim 7, further comprising:
inserting the rod into a subsequent loop portion of the plurality of loop portions; and
fastening a subsequent retainer of the plurality of retainers on the second side of the seat suspension layer onto a subsequent support member of the second plurality of support members on the second side frame member.

9. The method according to claim 2,
wherein the loop member is sewn along the second side of the seat suspension layer.

10. The method according to claim 1,
wherein the retainer comprises a pair of opposing edges connected by a connecting edge,
wherein the retainer is fastened to the support member such that the pair of opposing edges extends in the direction substantially perpendicular to the plane defined by the first and second side frame members.

11. The method according to claim 1,
wherein the retainers are made of plastic, metal, composite, or a material having sufficient strength for the retainers to hold the seat suspension layer.

12. The method according to claim 1,
wherein the support member is arranged to protrude substantially perpendicularly from the respective plane defined by the first and second side frame members.

13. The method according to claim 1,
wherein the seat frame is a seat back frame or a seat pan frame.

14. The method according to claim 1, wherein the seat suspension layer comprises a seat suspension fabric.

15. A passenger seat, comprising
a seat frame having a first side frame member and a second side frame member opposed to and spaced apart from each other, wherein the first side frame member comprises a plurality of portions and the second side frame member comprises a plurality of portions, wherein respective planes are defined by pairs of a respective one of the plurality of portions of the first side frame member and a corresponding respective one of the plurality of portions of the second side frame member and wherein the respective planes are inclined relative to each other;

a seat suspension layer installed on the seat frame;

wherein a plurality of retainers on a first side of the seat suspension layer are fastened onto a first plurality of support members respectively located on the plurality of portions of the first side frame member, and a plurality of retainers on a second side of the seat suspension layer are fastened onto a second plurality of support members respectively located on the plurality of portions of the second side frame member, the second side of the seat suspension layer being opposed to and spaced apart from the first side of the seat suspension layer;

wherein each retainer comprises a pair of opposing edges connected by a connecting edge;

wherein each retainer is fastened to one of the support members such that the pair of opposing edges extends in a direction substantially perpendicular to the respective planes; and wherein each retainer on the first side of the seat suspension layer comprises an elongated body extending along a respective one of the plurality of portions of the first side frame member and each retainer on the second side of the seat suspension layer comprises an elongated body extending along a respective one of the plurality of portions of the second side frame members.

16. The passenger seat according to claim 15, wherein the seat suspension layer comprises a loop member along the second side of the seat suspension layer, the loop member being configured to receive a rod therein during installation of the seat suspension layer onto the seat frame.

17. The passenger seat according to claim 16, wherein the loop member is split into a plurality of loop portions.

18. The passenger seat according to claim 15, wherein the retainers are made of plastic, metal, composite, or a material having sufficient strength for the retainers to hold the seat suspension layer.

19. The passenger seat according to claim 15, wherein the support member is arranged to protrude substantially perpendicularly from the respective plane defined by the first and second side frame members.

20. The passenger seat according to claim 15, wherein the seat frame is a seat back frame or a seat pan frame.

* * * * *